(12) United States Patent
Lyons, III

(10) Patent No.: US 6,902,279 B2
(45) Date of Patent: Jun. 7, 2005

(54) HOLLOW RETROREFLECTOR ASSEMBLY WITH A SINGLE BONDING SURFACE AND SINGLE MOUNTING SURFACE MOUNTING MEMBER

(75) Inventor: James Joseph Lyons, III, Keedysville, MD (US)

(73) Assignee: PROSystems, Inc., Kearneysville, WV (US)

( * ) Notice: Subject to any disclaimer, the term of this patent is extended or adjusted under 35 U.S.C. 154(b) by 0 days.

(21) Appl. No.: 10/238,591

(22) Filed: Sep. 11, 2002

(65) Prior Publication Data

US 2003/0048533 A1 Mar. 13, 2003

Related U.S. Application Data

(60) Provisional application No. 60/318,365, filed on Sep. 12, 2001.

(51) Int. Cl.[7] ................................................ G02B 5/122
(52) U.S. Cl. ...................................... 359/529; 359/530
(58) Field of Search ................................. 359/529, 850, 359/846, 848, 530

(56) References Cited

U.S. PATENT DOCUMENTS 5,122,901 A 6/1992 Bleier
5,335,111 A 8/1994 Bleier
6,485,153 B2 * 11/2002 Ota ............................. 359/859

OTHER PUBLICATIONS

Bass et al, Handbook of Optics, 1995, McGraw–Hill, Inc., vol. I Fundamentals, Techniques, and Design, pp. 37.22–37.23.*

* cited by examiner

Primary Examiner—Euncha P. Cherry
(74) Attorney, Agent, or Firm—Volentine, Francos & Whitt, PLLC

(57) ABSTRACT

A retroreflector assembly is assembled by adhering a retroreflector to a mounting member along a single flat back surface of the retroreflector and a flat surface of the mounting member. The retroreflector does not otherwise contact the mounting member. The retroreflector includes three plates having optically flat reflective front surfaces disposed at right angles to each other, wherein each of the plates further has a back surface disposed on an opposite side of the plate from the optically flat reflective front surface. The mounting member comprises a bonding portion and a base portion connected to the bonding portion, wherein the bonding portion is adhered to the back surface of one of the three plates, and wherein the bonding portion comprises a same material as the one of the three plates to which the bonding portion is adhered.

34 Claims, 7 Drawing Sheets

HOLLOW RETROREFLECTOR ASSEMBLY WITH A SINGLE BONDING SURFACE AND SINGLE MOUNTING SURFACE MOUNTING MEMBER

CROSS-REFERENCES TO RELATED APPLICATIONS

The present application claims the priority benefit from U.S. provisional patent application No. 60/318,365, filed on Sep. 12, 2001 naming inventor James Lyons III, the entire contents of which are hereby incorporated herein by reference for all purposes as if fully set forth herein.

BACKGROUND OF THE INVENTION

1. Field of the Invention

The present invention is directed to mounted retroreflectors, more particularly to a retroreflector assembly having a single bonding surface for adhering a retroreflector to a mounting member, and to a single bonding surface mounting member for mounting a retroreflector.

2. Description of the Related Art

Hollow retroreflectors, consisting of three plates having optically flat reflective surfaces disposed at right angles to each other, and meeting at what can be described as a common inside corner of an imaginary cube (hereinafter referred to as "the central junction"), are well known in the art. In general, hollow retroreflectors return reflected light along a path parallel to incident light. In insuring this performance, the relative perpendicularity of the reflective surfaces needs to be maintained.

When the hollow retroreflector is to be mounted in position for a particular application, it is important to secure the retroreflector without applying stresses, which could deflect the reflective surfaces out of their perpendicular alignment. The mounting member for the retroreflector should also minimize the effect of external stresses that the retroreflector may be subject to in operation.

Previous retroreflector assemblies typically include providing the attachment of the retroreflector to the mounting member on at least two surfaces of the retroreflector. Such mounting can result in stresses being induced on the retroreflector.

U.S. Pat. No. 5,335,111 describes a prior art hollow retroreflector assembly. In the prior art hollow retroreflector mounting member, the mounting member has first and second receiving surfaces disposed at right angles to each other. The first receiving surface is adhered to a portion of the first side of one of the plates of the retroreflector, and the second receiving surface is adhered to a portion of the second side of the same plate of the retroreflector.

Accordingly, with the prior art mounting member and retroreflector assembly, the retroreflector must be bonded to the mounting member in two places at two different bonding surfaces. The mounting member is also bonded to the sides of the retroreflector plate.

Thus, the bonding process is somewhat complicated. Also, because there are two different bonding surface steps, there is an increased potential for damage during the bonding process. Also, because there are two different bonding surfaces, there is an increased possibility of stresses being applied during the bonding process, perhaps deflecting the plate from true perpendicularity.

Accordingly, it would be advantageous to provide an improved mounting member for a retroreflector. It would also be advantageous to provide an improved retroreflector assembly. Other and further objects and advantages will appear hereinafter.

SUMMARY OF THE INVENTION

The present invention is therefore directed to an improved mounting member for a retroreflector, a hollow retroreflector assembly, and associated methods of mounting a retroreflector to a mounting member.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

In one aspect of the invention, a retroreflector assembly comprises a retroreflector including three plates having optically flat reflective front surfaces disposed at right angles to each other, wherein each of the plates further has a back surface disposed on an opposite side of the plate from the optically flat reflective front surface, and a mounting member adapted for mounting the retroreflector thereon, comprising a bonding portion and a base portion connected to the bonding portion, wherein the bonding portion is adhered to the back surface of one of the three plates, and wherein the bonding portion comprises a same material as the one of the three plates to which the bonding portion is adhered.

In another aspect of the invention, a mounting member is adapted for mounting thereon a retroreflector having three plates having optically flat reflective front surfaces disposed at right angles to each other and each plate having a back surface disposed on an opposite side of the plate from the optically flat reflective front surface, the mounting member being adhered to the retroreflector along the back side of one of the plates. The mounting member comprises a base portion and a bonding portion connected to the base portion, wherein the bonding portion comprises a same material as the one of the three plates to which it is adhered.

In still another aspect of the invention, a retroreflector assembly comprises a retroreflector including three plates having optically flat reflective front surfaces disposed at right angles to each other and all three plates touching each other at a central junction, each plate having a back surface disposed on an opposite side of the plate from the optically flat reflective front surface, wherein one of the three plates further includes an extension portion extending from the back surface of said one plate away from and beneath the central junction by a predetermined distance, and a mounting member adapted for mounting said retroreflector thereon, comprising a base portion adhered to said extension portion of said one plate.

DESCRIPTION OF THE PREFERRED EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known devices and methods are omitted so as not to obscure the description of the present invention with unnecessary details.

Figure 1:
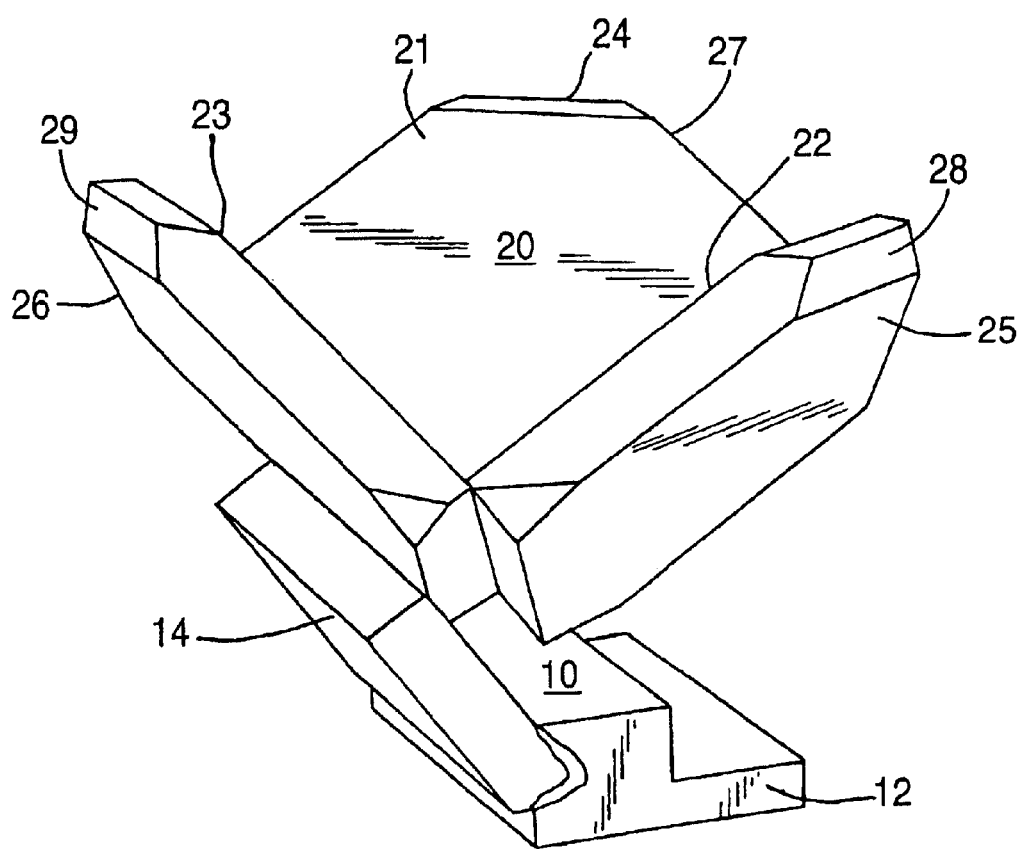
FIG. 1 is a perspective side view of a retroreflector assembly in accordance with an embodiment of the present invention.
Figure 2:
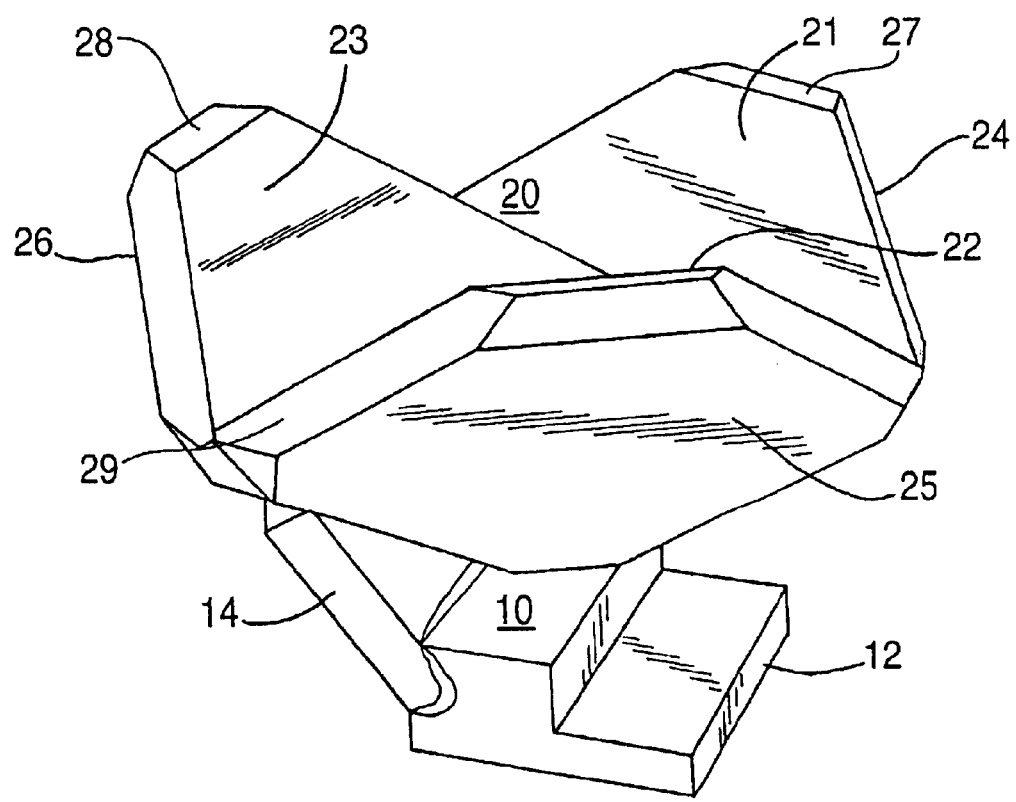
FIG. 2 is a perspective three-quarters top view of the retroreflector assembly of FIG. 1.

FIGS. 1–2 illustrate perspective side and top views, respectively, of a hollow retroreflector 20 on a mounting member 10. The retroreflector 20 has three plates 27–29 having opposing reflective front surfaces, 21–23, and corresponding back surfaces 24–26. The mounting member 10 includes a base portion 12 and a bonding portion 14.

As can be seen in FIGS. 1–2, the retroreflector 20 is adhered to the bonding portion 14 along one of the back surfaces 24–26 of the retroreflector, here shown as back surface 26. Beneficially, the bonding portion 14 is adhered to the back surface 26 using an epoxy, beneficially a semi-rigid epoxy. The epoxy is beneficially applied along side the outer edges of the back surface 26 in a generally "V-shaped" pattern.

Figure 3:
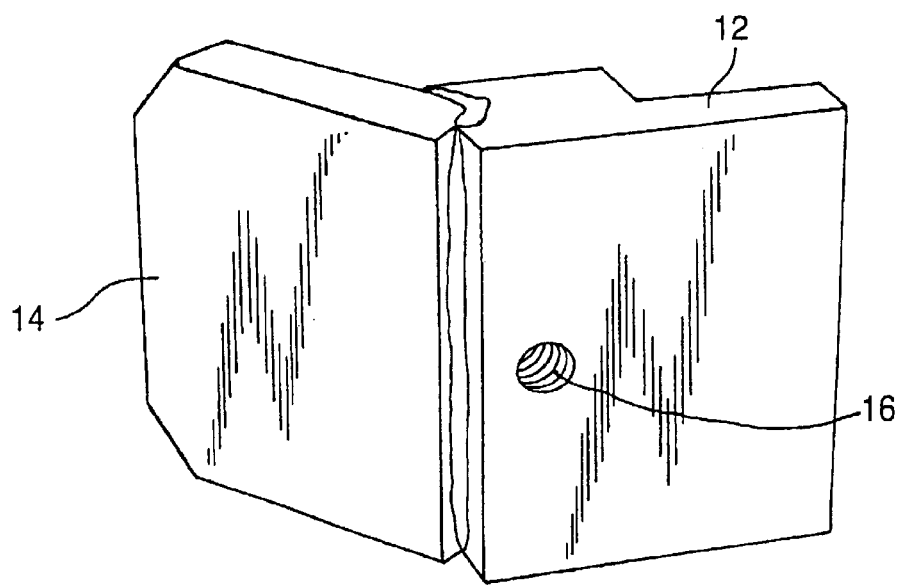
FIG. 3 is a perspective bottom view of the mount of FIG. 1.
Figure 4:
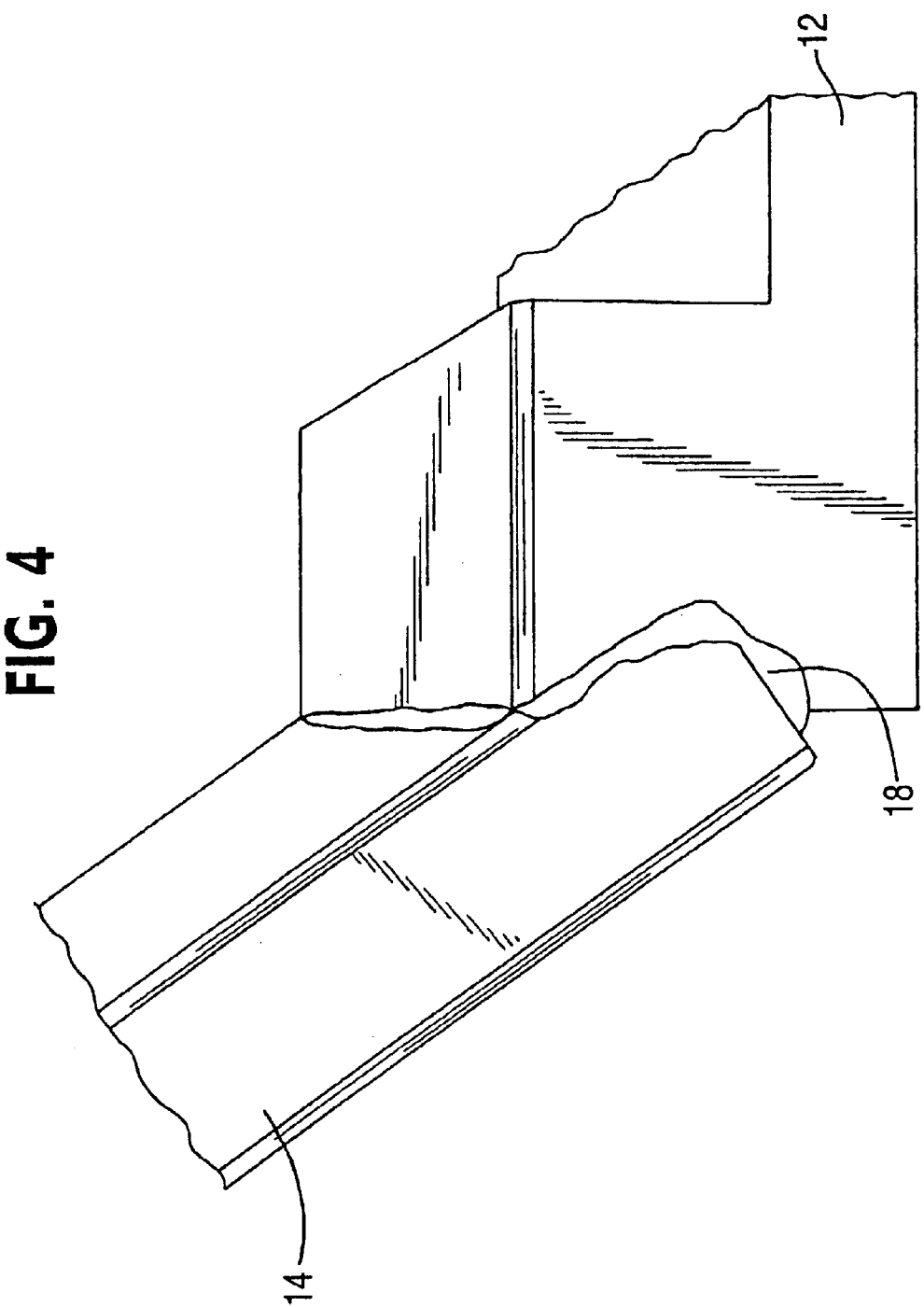
FIG. 4 is a detailed perspective side view of a notch in the mount of FIG. 1.
Figure 5:
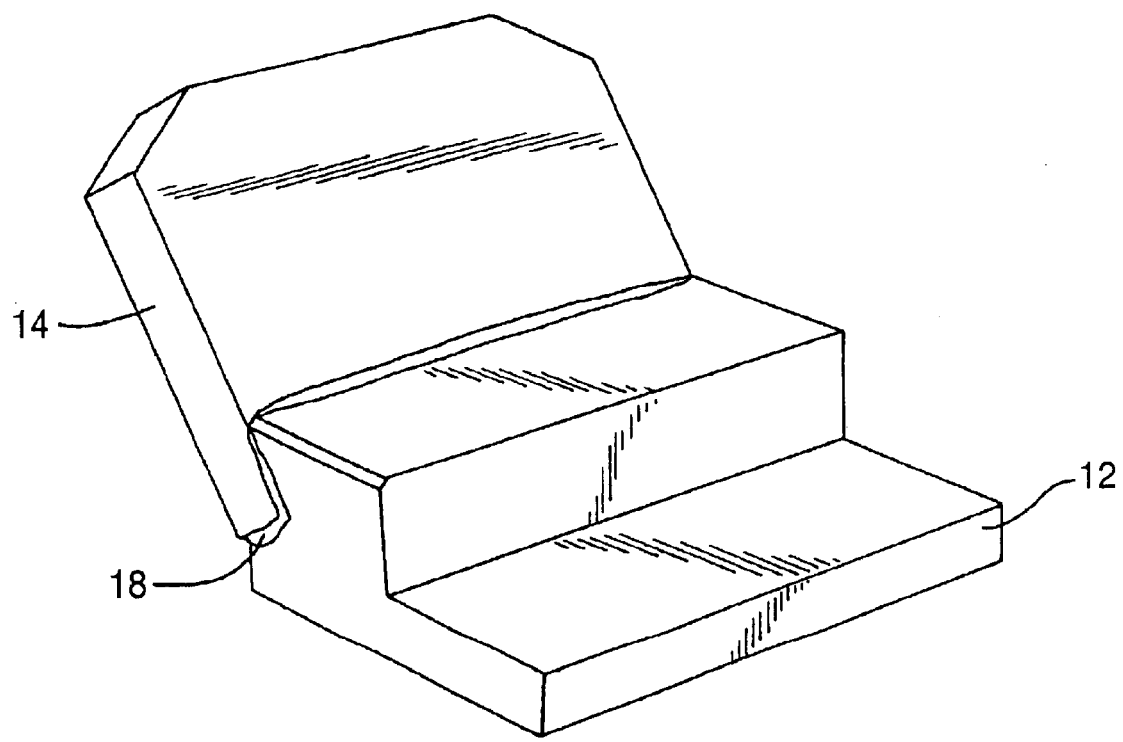
FIG. 5 is a perspective three-quarters top view of the mount of FIG. 1.

In the particular configuration shown in FIGS. 1 and 2, and shown in more detail in the various views of the mounting member alone in FIGS. 3–5, the bonding portion 14 and the base portion 12 may be made of different materials. For example, the base portion 12, which is to be affixed to a support member at a desired position, may be made of an easily machined metal, e.g., aluminum. This is of particular interest if an attachment hole or bore 16 (which may be threaded) is to be provided in the base portion 12, as can be seen in FIG. 3.

Significantly, the bonding portion 14 may be of the same material as the one of the three plates of the retroreflector 20 to which the bonding portion 14 is adhered. In a preferred embodiment, the bonding portion 14 and the one of the three plates of the retroreflector 20 to which the bonding portion 14 is adhered are each made of glass. As such, the bonding portion 14 functions as a transition piece having the same thermal and mechanical characteristics as the retroreflector 20 to be bonded thereto. This two-piece design allows the base portion 12 and the bonding portion 14 to be tailored for use with a particular instrument or support and/or with a particular retroreflector.

As can be seen in detail in the embodiment shown in FIG. 4, the bonding portion 14 is attached to the base portion 12 on two surfaces which are formed at 90 degrees with respect to each other in a notch 18 which is formed in the base portion 12. The stepped structure of the base portion 12 allows the notch 18 to be provided therein while offering substantial contact to the bonding portion 14 to insure rigid attachment thereof. Beneficially, the bonding portion 14 is attached to the base portion 12 by an epoxy. This particular bonding arrangement provides a strong rigid thermally stable mount. In this design, stresses induced by temperature are mitigated at the juncture of the base portion 12 and the bonding portion 14. However, it should be understood that other arrangements for connecting the bonding portion 14 to the base portion 12 are contemplated.

Figure 6A:
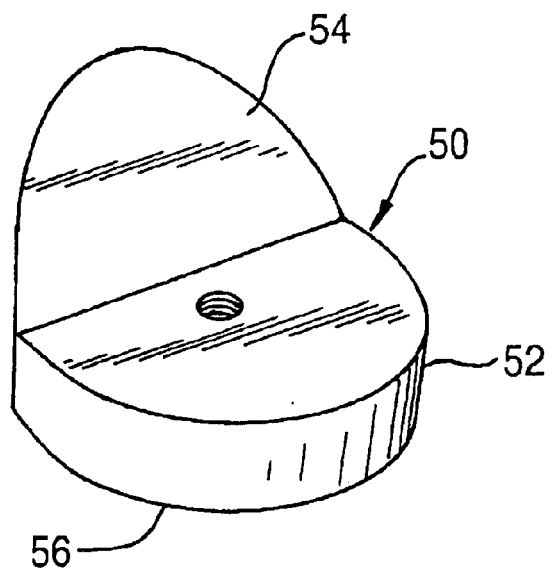
FIG. 6A is a perspective top view of a mount for a retroreflector according to another embodiment of the present invention.
Figure 6B:
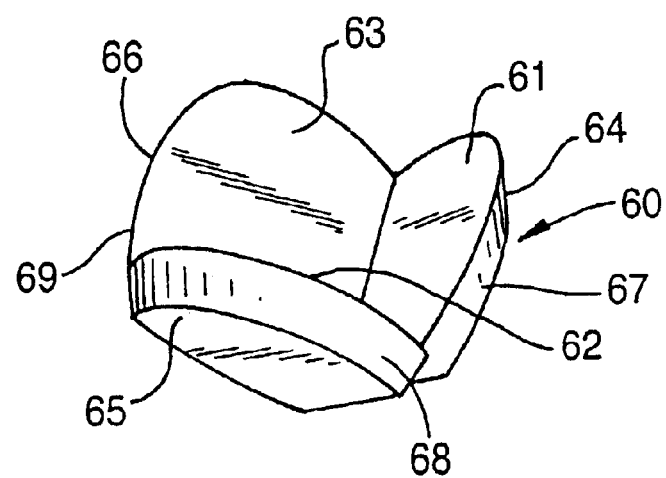
FIG. 6B is a perspective top view of a retroreflector according to another embodiment of the present invention, to be mounted on the mount shown in FIG. 6A.

FIG. 6A illustrates a unitary design of a mounting member 50 for receiving a retroreflector 60, shown in FIG. 6B therein. As before, the retroreflector 60 includes three plates 67–69 having three reflective front surfaces 61–63 and three corresponding back surfaces 64–66. Here, the mounting member 50 is an integral piece, i.e., the base portion 52 and the bonding portion 54 are of the same material. This same material may provide the desired thermal stability by being made of the same materials the bonding portion 14 was made of in the first embodiment, i.e., the same material as that of the retroreflector 60 to be bonded thereto (e.g., glass). Again, only one back surface 64–66 is bonded to the bonding portion 54. Further, an attachment hole or bore 56 (which may be threaded) may be provided in the mounting member 50.

In both configurations, a single flat back surface of the retroreflector is bonded to a flat surface of the mounting member. The retroreflector does not otherwise contact the mounting member. The use of only a single surface on the back reflector reduces stresses imposed on the retroreflector. Further, the use of flat planar surfaces allows a rigid bonding of the retroreflector to be realized while only bonding to a single surface. The bonding of the flat surfaces is easier to realize and results in a simple mount, both of which reduce costs associated with the mounted retroreflector. Finally, thermal stability may be achieved by matching the thermal characteristics of the mount in contact with the retroreflector to that of the retroreflector.

Figure 7:
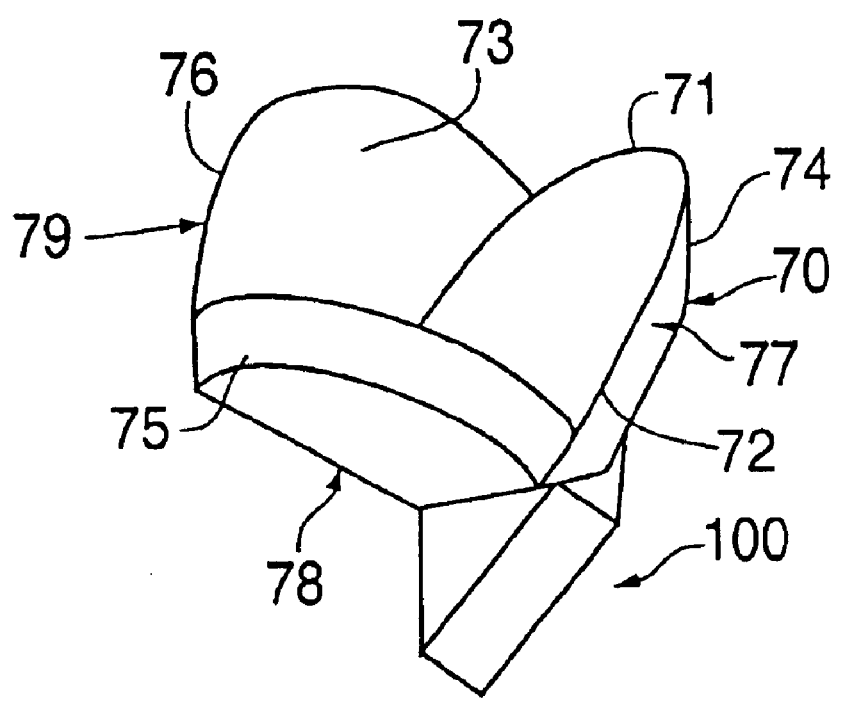
FIG. 7 is a perspective top view of a retroreflector according to another embodiment of the present invention.

FIG. 7 illustrates an alternative arrangement wherein a retroreflector 70 comprising three plates 77–79 having three reflective front surfaces 71–73 and three corresponding back surfaces 74–76. Here, one of the three plates 77–79 (e.g., 78) includes an extension portion 100 extending therefrom. The extension portion 100 extends from the back surface of the plate away 78 away from and beneath the central junction where the three plates 77–79 all meet. The extension portion 100 performs corresponding functions to the bonding portion 14 shown in the first embodiment, but has the advantage of not requiring to be bonded to the retroreflector 70 as it is instead integrally formed with one of the plates 78. The extension portion 100 may be formed of any desired shape or length, but provides thermal relief from a location where it is bonded to a base member (e.g., the base member 12) and the location of the reflective surfaces of the retroreflector 70.

While preferred embodiments are disclosed herein, many variations are possible which remain within the concept and scope of the invention. Such variations would become clear to one of the ordinary skill in the art after inspection of the specification, drawings and claims herein. The invention therefore is not to be restricted except within the spirit and scope of the appended claims.

What is claimed is:

1. A retroreflector assembly, comprising:
   a retroreflector including three plates having optically flat reflective front surfaces disposed at right angles to each other, wherein each of said plates further has a back surface disposed on an opposite side of the plate from the optically flat reflective front surface; and
   a mounting member adapted for mounting said retroreflector thereon, comprising a bonding portion and a base portion connected to the bonding portion, wherein said bonding portion is adhered to said back surface of one of said three plates, and wherein said bonding portion comprises a same material as the one of said three plates to which said bonding portion is adhered.

2. The retroreflector assembly of claim 1, wherein the bonding portion and the one of said three plates to which said bonding portion is adhered are each comprised of glass.

3. The retroreflector assembly of claim 2, wherein said base portion comprises a different material from said bonding portion.

4. The retroreflector assembly of claim 3, wherein said base portion comprises a metal.

5. The retroreflector assembly of claim 4, wherein said metal is aluminum.

6. The retroreflector assembly of claim 1, wherein said base portion comprises a different material from said bonding portion.

7. The retroreflector assembly of claim 6, wherein said base portion comprises a metal.

8. The retroreflector assembly of claim 7, wherein said metal is aluminum.

9. The retroreflector assembly of claim 1, wherein said mounting member further comprises means for attaching said retroreflector assembly to a support.

10. The retroreflector assembly of claim 9, wherein said base member has a bore extending therein.

11. The retroreflector assembly of claim 10, wherein said bore is threaded for receipt of a substantially correspondingly threaded member extending from the support.

12. The retroreflector assembly of claim 1, further comprising an adhesive adhering said bonding portion to said back surface of the one of said three plates.

13. The retroreflector assembly of claim 12 wherein said adhesive is a semi-rigid epoxy.

14. The retroreflector assembly of claim 1, wherein said mounting member further comprises an adhesive adhering said base portion to said bonding portion.

15. For a retroreflector having three plates having optically flat reflective front surfaces disposed at right angles to each other and each plate having a back surface disposed on an opposite side of the plate from the optically flat reflective front surface, a mounting member adapted for mounting said retroreflector thereon along the back surface of one of the plates, the mounting member comprising:
    a base portion; and
    a bonding portion connected to the base portion, wherein said bonding portion comprises a same material as the one of the three plates to which it is adhered.

16. The mounting member of claim 15, wherein said bonding portion is comprised of glass.

17. The mounting member of claim 16, wherein said base portion comprises a different material from said bonding portion.

18. The mounting member of claim 17, wherein said base portion comprises a metal.

19. The mounting member of claim 18, wherein said metal is aluminum.

20. The mounting member of claim 15, wherein said base portion comprises a different material from said bonding portion.

21. The mounting member of claim 20, wherein said base portion comprises a metal.

22. The mounting member of claim 21, wherein said metal is aluminum.

23. The mounting member of claim 15, wherein said mounting member further comprises means for attaching the mounting member to a support.

24. The mounting member of claim 23, wherein said base member has a bore extending therein.

25. The mounting member of claim 24, wherein said bore is threaded for receipt of a substantially correspondingly threaded member extending from the support.

26. A retroreflector assembly, comprising:
    a retroreflector including three plates having optically flat reflective front surfaces disposed at right angles to each other and all three plates touching each other at a central junction, each plate having a back surface disposed on an opposite side of the plate from the optically flat reflective front surface, wherein one of the three plates further includes an extension portion extending from the back surface of said one plate away from and beneath the central junction by a predetermined distance; and
    a mounting member adapted for mounting said retroreflector thereon, comprising a base portion adhered to said extension portion of said one plate.

27. The retroreflector assembly of claim 26, wherein said base portion comprises a different material from said extension portion.

28. The retroreflector assembly of claim 27, wherein said base portion comprises a metal.

29. The retroreflector assembly of claim 28, wherein said metal is aluminum.

30. The retroreflector assembly of claim 26, wherein said mounting member further comprises means for attaching the mounting member to a support.

31. The retroreflector assembly of claim 30, wherein said base member has a bore extending therein.

32. The retroreflector assembly of claim 31, wherein said bore is threaded for receipt of a substantially correspondingly threaded member extending from the support.

33. The retroreflector assembly of claim 1, wherein said bonding portion is adhered to said back surface of said one of said three plates along outer edges of said back surface.

34. The retroreflector assembly of claim 1, wherein said adhesive is disposed along outer edges of said back surface of said one of said three plates in a generally V-shaped pattern.

* * * * *